United States Patent [19]

Lieberman

[11] 3,998,660
[45] Dec. 21, 1976

[54] METHOD OF PREPARING DRY THIONYL CHLORIDE ELECTROLYTE

[75] Inventor: Sheldon I. Lieberman, Burlington, Mass.

[73] Assignee: GTE Laboratories Incorporated, Waltham, Mass.

[22] Filed: June 5, 1975

[21] Appl. No.: 584,075

[52] U.S. Cl. ............................. 429/196; 423/468
[51] Int. Cl.$^2$ ......................................... H01M 6/04
[58] Field of Search .......... 423/468; 136/154, 155, 136/156

[56] References Cited

UNITED STATES PATENTS

| | | | |
|---|---|---|---|
| 2,393,247 | 1/1946 | Hallowell et al. | 423/468 |
| 2,420,623 | 5/1947 | Salzenberg et al. | 423/468 |
| 2,431,823 | 12/1947 | Pechukas | 423/468 |
| 2,471,946 | 5/1949 | Fricke | 423/468 |
| 2,529,671 | 11/1950 | Bissinger | 423/468 |
| 2,539,679 | 1/1951 | Prager | 423/468 X |
| 2,779,663 | 1/1957 | Trager | 423/468 |
| 3,155,457 | 11/1964 | Kunkel | 423/468 |
| 3,156,529 | 11/1964 | Rosenberg et al. | 423/468 |
| 3,419,353 | 12/1968 | Horvath et al. | 423/468 |
| 3,891,458 | 6/1975 | Eisenberg | 136/155 X |

FOREIGN PATENTS OR APPLICATIONS

| | | | |
|---|---|---|---|
| 538,028 | 7/1941 | United Kingdom | 423/468 |

*Primary Examiner*—John H. Mack
*Assistant Examiner*—C. F. LeFevour
*Attorney, Agent, or Firm*—Irving M. Kriegsman

[57] ABSTRACT

Thionyl chloride electrolyte having less than about 1 ppm water contamination is prepared by mixing dry thionyl chloride solvent with sulfuryl chloride electrolyte having less than about 1 ppm water contamination and then removing the sulfuryl chloride.

5 Claims, No Drawings

METHOD OF PREPARING DRY THIONYL CHLORIDE ELECTROLYTE

BACKGROUND OF THE INVENTION

This invention relates to a method of preparing thionyl chloride electrolyte and more particularly to a method of preparing thionyl chloride electrolyte having a water contamination or less than about 1 ppm for use in electrochemical cells.

In recent years a great amount of effort has been exerted in trying to increase the power density of electrochemical cells. Much of this effort has been in the development of batteries of cells which utilize alkali metal anodes and in particular lithium anodes.

In U.S. patent application Ser. No. 419,568, filed on Nov. 28, 1973, and assigned to the assignee of this application there is disclosed an electrochemical cell having a lithium anode and an oxyhalide electrolyte such as thionyl chloride in lithium tetrachloroaluminate or sulfuryl chloride in lithium tetrachloroaluminate. It has been found that it may be desurabke ti reduce the water content of the electrolyte to as low as possible in order to prevent the reaction of any water present with the electrolyte and with the lithium anode.

In this endeavor, it had been found that dry sulfuryl chloride electrolyte that employed lithium tetrachloroaluminate solute could be prepared to have less than 1 ppm of water by allowing the electrolyte to stand over lithium metal. However this technique was not successful when thionyl chloride was used as the electrolyte solvent.

Attempts were made to prepare dry thionyl chloride, $SOCl_2$, electrolyte compositions by dissolving the $LiAlCl_4$ in the previously prepared dry solvent or by the situ formation of the salt by the addition of stoichiometric amounts of $AlCl_3$ and LiCl to the solvent. By either technique, the water contamination was found to be approximately 100 ppm. The use of "dry" solutes in solvent was found to be unemployable.

Thus, it is an object of the invention to prepare dry thionyl chloride electrolyte.

Another object is to prepare thionyl chloride electrolyte having water contamination on the order of only about 1 ppm. for use in electrochemical cells.

SUMMARY OF THE INVENTION

It has been found that dry thionyl chloride electrolytes can be prepared by mixing sulfuryl chloride electrolyte previously dried over lithium metal with dry thionyl chloride solvent, followed by a removal of the sulfuryl chloride as by distillation. The solutes present will remain in the thionyl halide. The thionyl chloride so prepared has been found to contain only approximately 1 ppm of water contamination, as measured on a Perkin Elmer infrared spectrophotometer.

In carrying out this procedure, the original dry thionyl chloride has about 5 ppm of water therein when the solvent is added to the sulfuryl chloride electrolyte.

It was found that this technique gave reproducible satisfactory results whereas other attempts to prepare dry thionyl chloride electrolytes such as by the use of dry solutes such as the $LiAlCl_4$ did not work. This last mentioned concept is almost impossible to carry out, as the solute which is packaged in closed containers picks up moisture from the environment upon opening of the glass shipping ampules, even if precautions are taken.

By the use of such procedure, dry thioyl chloride electrolytes can be prepared.

To further illustrate the foregoing and other aspects of my invention, reference should be made to the following examples, which are illustrative and representative of the invention.

EXAMPLE 1

A quantity of 100 ml. of thionyl chloride solvent which had less than 1 ppm of water therein was mixed with 100 ml. (2 molar) $AlCl_3$ + LiCl sulfuryl chloride electrolyte which electrolyte had been previously dried according to known techniques by allowing it to stand over lithium metal, such that the water content was only about 1 ppm. A distillation column was set up and the sulfuryl chloride, which boils at 69.3° C as compared to the thionyl chloride which boils at 79° C, was distilled off under a flow of argon gas, after a small amount of chlorine gas and some low boiling point material was collected. The distillate came over at between 64.5° and 65.5° C. Distillation was discontinued when the head temperature reached 75° C. The electrolyte in the still was allowed to cool under the continuous flow of dry argon and was then transferred to an argon filled dry box. The thionyl chloride electrolyte was reconstituted to 100 mls with dry thionyl solvent. I.R. analysis of the water contamination according to the technique of French, Cukor, Persiani and Auburn in E.C.S. 121 at page 1045 (1974) indicated a contamination of less than 1 ppm of water.

EXAMPLE 2

Utilizing the techniques of Example 1, but with a substitution of dry thionyl bromide for the thionyl chloride, a dry thionyl bromide electrolyte having less than 1 ppm water therein can be prepared.

EXAMPLE 3

Dry thionyl chloride electrolyte having lithium hexachloro-antimonate ($LiSbCl_6$) as the solute is prepared by employing procedures to those of Example 1.

EXAMPLE 4

An electrochemical cell having spiral wound electrodes, of lithium metal as the anode and carbon as the cathode was filled with 11.1 ml. of 2 molar ($AlCl_3$ — LiCl) solute in $SOCl_2$ solvent as the electrolyte prepared according to this invention. The open circuit voltage for the cell was 3.77 volts. The cell was then discharged after 15 days storage at 65° C at 160 milliamperes and had a steady voltage of 3.4 volts. It went below 3 volts after 27.5 hours and had a capacity of 4.4 ampere hours.

EXAMPLE 5

A similar cell was prepared with 12.3 ml. of electrolyte. The open circuit voltage was 3.77 volts. The cell had a capacity of 4.7 ampere hours to a cut off of 3 volts, when discharged at 160 milliamperes after 15 days of storage at 65° C.

EXAMPLE 6

A cell comprising a 1 molar solution of lithium hexachloroantimonate is made up in thionyl chloride according to this invention, a lithium electrode and a 90% carbon black electrode was prepared. The cell exhibited an open circuit voltage of 3.65 volts and could sustain a 1 $mA/cm^2$ discharge at 3.5 volts or a 5 $mA/cm^2$ discharge at 3.3 volts.

It is believed that the technique described above for preparing dry thionyl chlorie electrolyte can be employed with other known inorganic solvents that are used for electrolyte formation, provided that the thionyl chloride has a higher boiling point than the companion solvent, and that no side-reactions or miscibility problems are present.

While the discussion has focused upon the use of distillation as the technique to separate the thionyl chloride from the sulfuryl chloride, it is understood that other separation techniqus known to the art may be employed. The use of such other techniques is of course dependent upon the co-solvent employed and the solute(s) used. One such technique is the freezing of the higher freezing point co-colvent with the thionyl chloride remaining as a liquid.

The term 'dry' as used herein is intended to mean 1 ppm or less water contamination.

What is claimed is:

1. A method of preparing thionyl chloride electrolyte having less than 1 ppm water contamination which comprises:
    a. Mixing dry thionyl chloride solvent with sulfuryl chloride electrolyte which has a solute therein suitable for preparation of lithium batteries, and which electrolyte has less than about 1 ppm of water contamination therein,
    b. Removing the sulfuryl chloride.

2. The process of claim 1 wherein the removing step comprises distilling off the sulfuryl chloride.

3. The method of claim 1 wherein the solute suitable for preparation of an electro-chemical cell is selected from the group consisting of lithium hexachloroantimonate, and lithium tetrachloroaluminate.

4. A method of preparing thionyl chloride-lithium tetrachloroaluminate for use in an electrochemical cell electrolyte which comprises:
    a. Preparing a sulfuryl chloride-lithium tetrachloroaluminate electrolyte with less than 1 ppm water combination,
    b. Adding dry thionyl chloride solvent to said electrolyte,
    c. Distilling off the sulfuryl chloride,
    d. Reconstituting the thionyl chloride-lithium tetrachloroaluminate electrolyte by adding additional dry thionyl chloride thereto.

5. The method of claim 4 wherein the sulfurylchloride-lithium tetrachloroaluminate electrolyte with less than 1 ppm water contamination is substituted for by sulfurylchloride-lithium hexachloroantimonate electrolyte with less than 1 ppm water contamination.

* * * * *

PO-1050
(5/69)
A126

UNITED STATES PATENT OFFICE
CERTIFICATE OF CORRECTION

Patent No. 3,998,660　　　　　　　Dated December 21, 1976

Inventor(s) SHELDON I. LIEBERMAN

It is certified that error appears in the above-identified patent and that said Letters Patent are hereby corrected as shown below:

Column 1, line 22, delete "desurabke ti" and substitute therefor --desirable to--.

Column 1, line 35, before "situ" insert --in--.

Column 2, line 9, delete "Alcl$_3$" and substitute therefor --AlCl$_3$--.

Column 2, line 37, delete "lethium" and substitute therefor --lithium--.

Column 2, line 39, after "procedures" insert --similar--.

Column 3, line 2, delete "chlorie" and substitute therefor --chloride--.

Column 3, line 11, delete "techniqus" and substitute therefor --techniques--.

Column 4, line 14, delete "combination" and substitute therefor --contamination--.

Signed and Sealed this

Eighth Day of March 1977

[SEAL]

Attest:

RUTH C. MASON　　　　　　　　　C. MARSHALL DANN
Attesting Officer　　　　　　　Commissioner of Patents and Trademarks